Dec. 26, 1922.
F. M. REEVES.
LINE CONTROL AND GEAR SHIFT FOR TRACTORS.
FILED NOV. 12, 1921.
1,439,759
2 SHEETS-SHEET 1
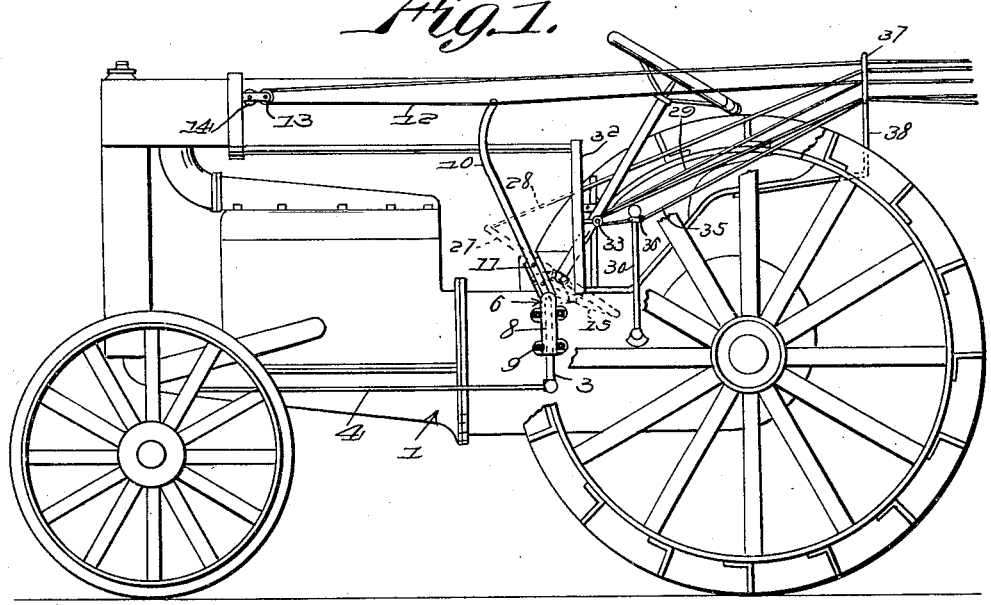
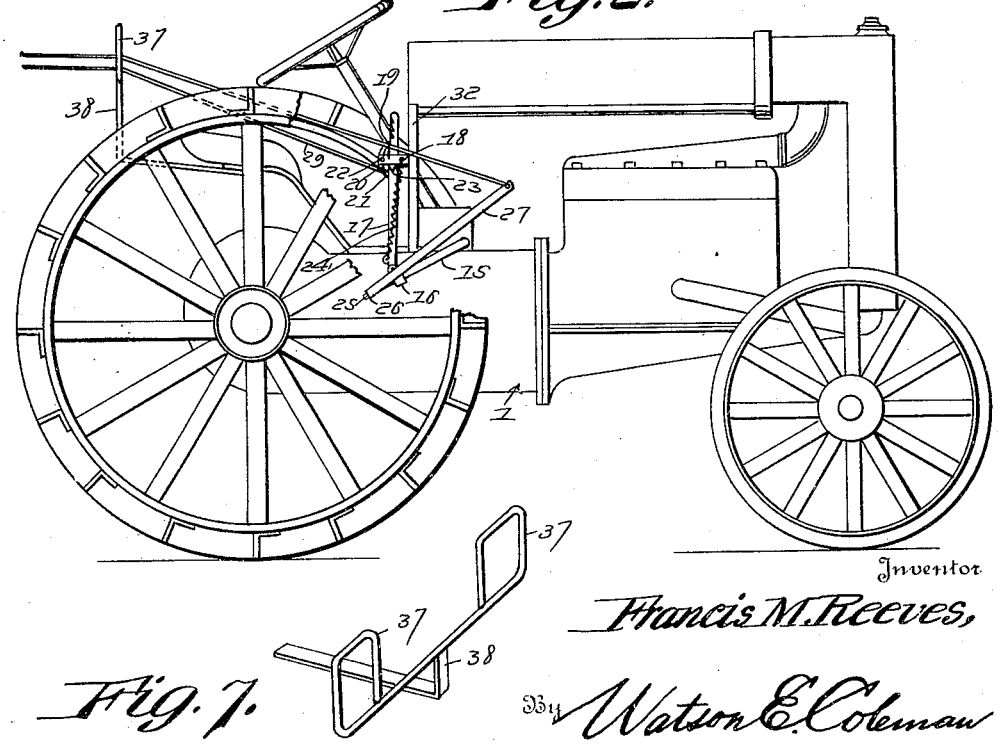
Inventor
Francis M. Reeves,
By Watson E. Coleman
Attorney Dec. 26, 1922.  
F. M. REEVES.  
LINE CONTROL AND GEAR SHIFT FOR TRACTORS.  
FILED NOV. 12, 1921.  
1,439,759  
2 SHEETS-SHEET 2
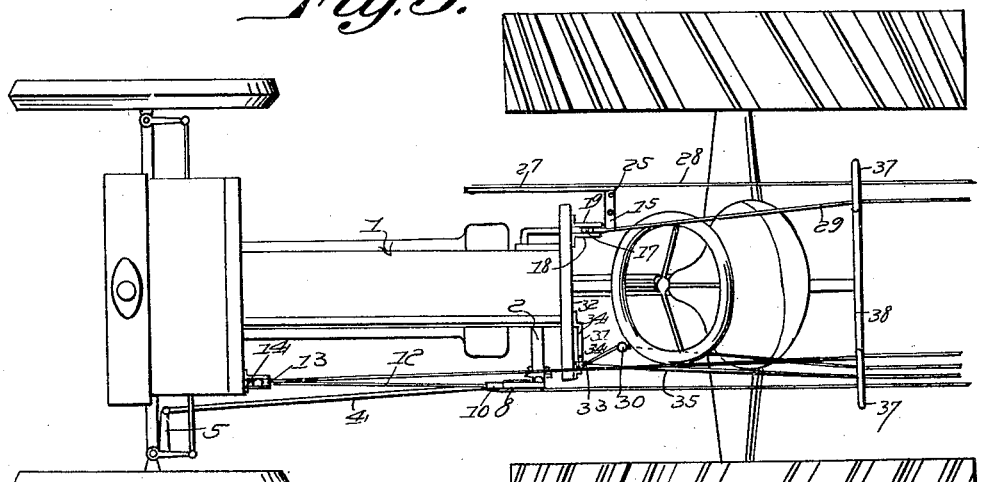
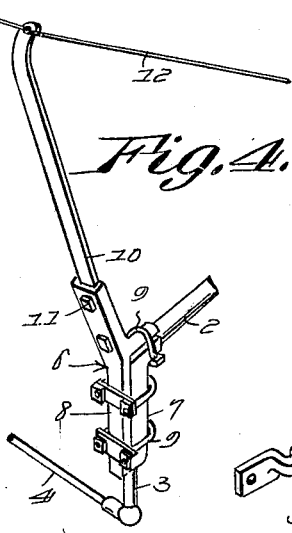
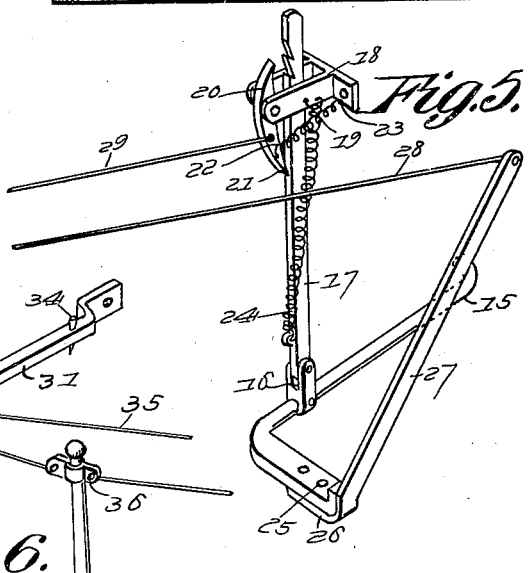
Inventor  
Francis M. Reeves,  
By Watson E. Coleman  
Attorney Patented Dec. 26, 1922.

1,439,759

UNITED STATES PATENT OFFICE.

FRANCIS M. REEVES, OF TINA, MISSOURI.

LINE CONTROL AND GEAR SHIFT FOR TRACTORS.

Application filed November 12, 1921. Serial No. 514,764.

*To all whom it may concern:*

Be it known that I, FRANCIS M. REEVES, a citizen of the United States, residing at Tina, in the county of Carroll and State of Missouri, have invented certain new and useful Improvements in Line Controls and Gear Shifts for Tractors, of which the following is a specification, reference being had to the accompanying drawings.

The present invention has for its purpose the provision of a line controlled shaft for tractors, particularly Fordsons, whereby they may be controlled from a point remotely to the rear of the tractor, for instance from a point on a cultivator, binder, mower, plow, disc harrow, wagon or any other implement, to operate at the rear of the tractor, whereby the machine or farming implement at the rear may be controlled, and also the tractor may be controlled by a single operator.

Another purpose is the provision of attachments for the steering wheel, clutch lever and gear shift lever, including lines or cables, which may be easily and very quickly folded or tied up or otherwise arranged on the tractor, when detached from the machine, such as a cultivator or the like at the rear, enabling the operator to assume a position on the seat of the tractor, and drive to the house from the field or other place quicker than it is possible to unhitch a team and drive to the house from the field.

Still another purpose involves the provision of attachments for the gear shift and clutch levers to the steering apparatus, whereby the tractor may be under absolute control and can turn at any angle.

A further purpose is the provision of attachments of this character, which can be cheaply manufactured and installed, and which when applied are efficient, and practical in construction.

A still further purpose consists in a cable or line so connected with the gear shift lever, so that the lever can be operated from second gear to low gear, and vice versa, or the lever shifted laterally to a position, so that by means of the same cable or the like, the gear shift lever may be shifted from high gear to second gear.

Additionally the invention aims to provide a cable or the like means for tilting the clutch lever, in combination with a catch or latch for holding the clutch lever in its actuated position, so that by pulling upon a cable or line the catch can be released, permitting the clutch lever to return to its initial operating geared position.

Also it is the aim to provide a lever connected to the rocking shaft (which is normally actuated by the steering wheel), so that by means of a cable operatively connected to the lever, the lever may tilt backward and forward, to rock said shaft, which in turn actuates a drag link and steers the front wheels of the tractor.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of the Fordson tractor, showing the improved control apparatus applied, more particularly showing the attachment for the steering mechanism, and also showing the attachment for the gear shift lever, illustrating in dotted lines the attachment for the clutch lever;

Figure 2 is a view in side elevation of the opposite side of a tractor showing the attachment for the clutch lever;

Figure 3 is a plan view of the tractor, showing all three attachments in position;

Figure 4 is an enlarged detail view of the attachment for the rocking shaft of the steering mechanism, whereby the drag link may be shifted for turning the front wheels;

Figure 5 is an enlarged detail view of the holding means for the rack bar which holds the clutch lever depressed;

Figure 6 is an enlarged detail view of the attachment for the gear shift lever;

Figure 7 shows a bracket for supporting the lines.

Referring to the drawings, 1 designates a tractor, which is provided with a rock shaft 2 having at one end an arm 3, which is connected to the usual drag link 4, which operatively connects with the steering arm 5 of the front wheels, whereby when the shaft 2 is rocked in one direction or the other, the front wheels may turn to the right or the left.

A casting 6 consisting of the two parts 7 and 8 is fastened upon the arm 3, immediately where it merges into the rock shaft 2, by means of the U-bolts 9. A lever 10 is secured to the part 8 of the casting 6 by means of one of the U-bolts 9, and also by means of the bolt 11, which passes through an extension of the part 8 of the casting 6. The upper end of the lever 10 terminates in a curved arm, to which a cable or rope 12 is connected. This rope extends forwardly and rearwardly, more rearwardly than forwardly, so that it may be easily grasped by an operator who may assume a position on a cultivator, binder, mower, plow, wagon or any other implement at the rear of the tractor, so that the cable or rope may be pulled. In fact the rope or cable is endless, and its loop portion engages over the pulleys 13 and 14, in such a manner as to prevent it disengaging therefrom. It is obvious that by moving first one side and then the other of the cable, the lever 10 may be tilted backwardly and forwardly, so as to rock the shaft 2, which in turn will impart movement to the drag link 4, and thence to the front wheels, through the medium of the steering arm.

Secured to the clutch lever 15 (which is ordinarily actuated by foot power) is a clamp 16, to which a ratchet toothed bar 17 is pivotally connected. A bracket 18 is secured to the dash, and its lateral arm is provided with forks 19, between which the ratchet toothed bar operatively engages. The dog 20 is pivoted between the ends of the forks, whereby its nose 21 may operatively engage any one of the teeth of the bar 17, so as to move it in different adjusted positions, when the clutch lever is tilted. A spring 22 is connected to the dog, and in turn connected at 23 to the bracket, to hold the dog normally in engagement with the teeth of the bar. A spring 24 is connected to the lower part of the bar 17, and its upper end is also connected at 23, serving to hold the clutch lever in its normal upper position. Secured by suitable bolts 25 to the lateral foot engaging portion of the clutch lever is the lateral portion 26 of an arm 27, which extends in a plane substantially parallel to and in the same direction with the lever 15, and terminates at a point beyond the fulcrum of the clutch lever. Obviously by means of the cable, rope or cord 28 which is attached to the extremity of the arm 27, the arm 27 and the clutch lever may be rocked, thereby actuating the clutch, and when so actuated, the bar 17 will move downward, and through the medium of the dog 20, it is held in a downward position. The line or cable 28 extends back from the tractor a considerable distance, say for instance a point on a plow or disc harrow or other implement or wagon, where it is convenient to be grasped by an operator, so that the clutch may be controlled from a distance remote from the clutch mechanism. When the cable or line 28 is pulled, and the clutch lever operated, the dog 20 holds the clutch lever in its actuated position. However when it is desired to release the clutch, and allow the clutch lever to return to its normal position under the action of the spring 24, a pulling action may be imparted upon the cable or line 29 (which is attached to the dog 20), so as to disengage the nose of the dog from the teeth of the bar 17. The release of the dog 20 will make it possible for the clutch spring (not shown and supplemented by the spring 24) to throw the clutch into driving engagement. The action of the spring 24 will also lift or return the clutch lever to its initial position.

The gear shift lever of a Fordson tractor has five positions, neutral, high, low, intermediate and reverse, so therefore it is the aim to shift the gear shift lever 30, when the tractor is operating in a field, from second gear to low gear, by pulling upon a rope, cable or line, and when the tractor is traveling on a road, it is the aim to shift the lever 30 from high gear to second gear, by pulling upon the other side of the rope.

For instance the guide bar 31 is mounted upon the dash 32, to which a pulley 33 is slidably connected, so as to be shifted sidewise. The pulley is designed to be held near one end or the other of the guide bar by means of pins 34, which pass through the bar. A cable, rope or line 35 is connected at 36 to the gear shift lever 30. One side of the line, cable, rope or the like 35 extends rearwardly, while the other side extends forwardly and over the pulley 33, and then rearwardly. In fact when the cable 35 is applied, it is endless, so obviously when one side of the cable or line 35 is pulled, the other side of the cable correspondingly moves, therefore the gear shift lever is tilted, say for instance forwardly. When the other side of the cable or line is pulled, the gear shift lever is moved rearwardly. Obviously in order to operate the gear shift lever for field work, the pulley 33 is moved to the left, and by means of one of the pins 34 the pulley 33 is held in a position to the left, in which case the gear shift lever may be moved backwardly and forwardly, for field work; in other words for shifting from second gear to low gear and vice versa. One of the pins 34 is used for holding the pulley 33 at a position to the right, and in this case the gear shift lever 30 may be shifted from high gear to second gear and vice versa, for road work. The cable or line 35, and the other lines or cables pass through suitable rings or eyes 37, which constitute part of a bracket 38, so as to prevent the lines or cables from sagging.

Obviously from the above description in connection with the drawings, an operator may be seated upon a cultivator, plow or harrow, wagon or other farming implement at the rear of the tractor, and control the tractor with as much ease and accuracy, as when occupying the seat on the tractor, and at the same time enabling the operator to control the farming implement, so that it may perform the work which it is intended to accomplish.

The invention having been set forth, what is claimed is:—

1. The combination with a tractor including a clutch lever, of an arm attached to the clutch lever and terminating at a point beyond its fulcrum, a cable attached to the extremity of said arm for actuating said clutch lever, holding means for the clutch lever comprising a ratchet bar operatively connected to the clutch lever, a dog engaging the teeth of said bar to hold the bar and the clutch lever depressed and the clutch lever out of gear, and means for returning said clutch lever to its initial position when the holding means is released.

2. The combination with a tractor including a clutch lever, of an arm attached to the clutch lever and terminating at a point beyond its fulcrum, a cable attached to the extremity of said arm for actuating said clutch lever, holding means for the clutch lever comprising a ratchet bar operatively connected to the clutch lever, a spring tensioned dog engaging the teeth of said bar to hold the bar actuated and the clutch lever depressed, means connected to the dog and terminating at a point remote from the tractor and being manually actuated for actuating the dog to disengage its nose from the teeth of said bar, thereby releasing it and permitting the clutch lever to move into driving engagement, and means for returning the clutch lever to its initial position when the holding means is released.

3. In combination with a tractor having gear shifting means and steering controlling means remote from the tractor, an arm secured to the clutch lever of the tractor, means remote from and connected to the arm for depressing the clutch lever and moving the clutch out of gear, a rack pivotally connected to the clutch lever, a holding guide for said rack, said holding guide being mounted upon the stationary part of the tractor, a dog pivotally mounted on the holding guide for engaging with the teeth of the rack, to hold the clutch lever depressed, means remote from and operatively connected with the dog for releasing its nose when in engagement with the teeth of the rack, and a spring connecting for holding guide and the rack, acting to raise the rack when the spring of the clutch operates to throw the clutch into driving engagement.

In testimony whereof I hereunto affix my signature.

FRANCIS M. REEVES.